Figure 3:
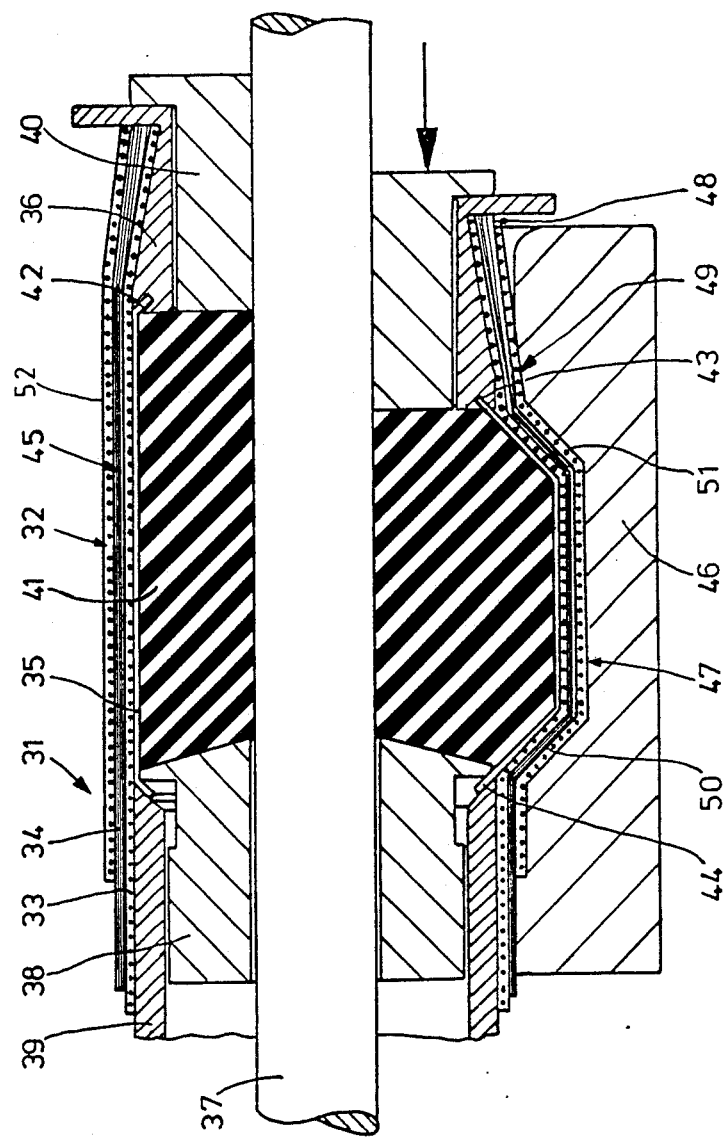

United States Patent [19]

Kacza et al.

[11] Patent Number: 4,942,904
[45] Date of Patent: Jul. 24, 1990

[54] HOLLOW SECTION, IN PARTICULAR A TUBE, OF LONG FIBRE REINFORCED PLASTIC

[75] Inventors: Martin Kacza, Aachen; Hartmut Rest, Langenfeld; Eberhard Born, Cologne, all of Fed. Rep. of Germany

[73] Assignee: Bayer Aktiengesellschaft, Fed. Rep. of Germany

[21] Appl. No.: 250,079

[22] Filed: Sep. 28, 1988

[30] Foreign Application Priority Data

Oct. 10, 1987 [DE] Fed. Rep. of Germany ....... 3734343

[51] Int. Cl.$^5$ ............................................. F16L 55/12
[52] U.S. Cl. ..................... 138/89; 425/393; 425/DIG. 218
[58] Field of Search ............... 138/103, 109, 89, 90, 138/178; 425/393, 392, DIG. 218

[56] References Cited

U.S. PATENT DOCUMENTS

| 2,366,853 | 1/1945 | Greene | 425/393 |
|---|---|---|---|
| 2,917,102 | 12/1959 | Mahady | 138/109 |
| 3,248,756 | 5/1966 | Mills et al. | 425/DIG. 218 |
| 3,284,849 | 11/1966 | Coleman et al. | 425/393 |
| 3,484,900 | 12/1969 | Sands et al. | 425/393 |
| 3,728,059 | 4/1973 | de Putter | 425/393 |
| 3,966,385 | 6/1976 | Spears | 425/393 |
| 3,986,810 | 10/1976 | Branche et al. | 425/393 |
| 3,989,440 | 11/1976 | Acda | 425/DIG. 218 |
| 4,006,757 | 2/1977 | Acda et al. | 138/109 |
| 4,107,249 | 8/1978 | Murai et al. | 425/393 |
| 4,277,231 | 7/1981 | Gordon | 425/393 |
| 4,762,152 | 8/1988 | Clausen | 138/89 |
| 4,774,043 | 9/1988 | Beckmann | 425/393 |

FOREIGN PATENT DOCUMENTS

| 2926493 | 6/1979 | Fed. Rep. of Germany . |  |
|---|---|---|---|
| 3400043 | 1/1984 | Fed. Rep. of Germany . |  |
| 986793 | 3/1965 | United Kingdom | 138/109 |

Primary Examiner—James E. Bryant, III
Attorney, Agent, or Firm—Connolly and Hutz

[57] ABSTRACT

In order to improve the introduction or uptake of force in a hollow section (1), in particular a tube, of long fibre reinforced plastic having an integrated force induction element (2) and to simplify its manufacture, a radial enlargement (4) is pressed into the hollow section (1) by means of a moulding body before the plastic matrix has hardened, which radial enlargement tapers into a narrow section (6) towards its free end (5), the jacket (3) which is formed in the process later enclosing an expansion element (9) with a clamping member (10) which merges into a tie rod (11), the expansion element (9) lying in a form-fitting manner against the interior of the enlargement (4,47) over the length of said enlargement.

7 Claims, 2 Drawing Sheets

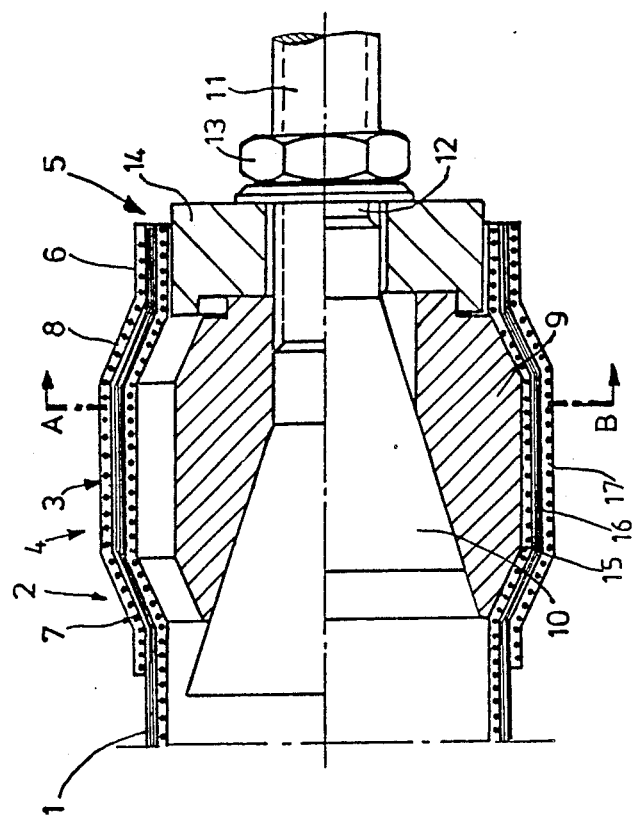
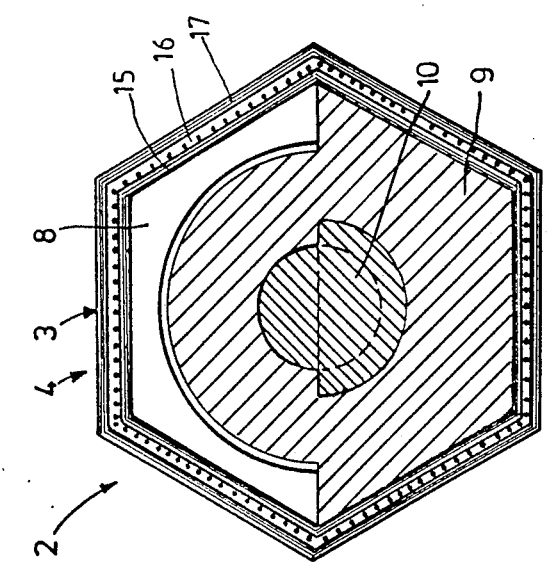

HOLLOW SECTION, IN PARTICULAR A TUBE, OF LONG FIBRE REINFORCED PLASTIC

The invention relates to a hollow section, in particular a tube, of long-fibre-reinforced plastic, having an integrated force induction element at least at one end, the jacket of which element consists of a portion of the hollow section itself and surrounds a core with a tie rod, and to a process for the manufacture of such a hollow section.

A hollow section with a form-fitting force-induction element is known (DE-A 2 926 493) which takes up longitudinal tensile and pressure forces. The longitudinal tensile forces are for the most part taken up only by the wrapping of fibres which are directed more or less axially while the longitudinal pressure forces are mainly taken up only by the fibre-reinforced central tube. The reason for this is that the wrapping of fibres around the already cured central tube does not create sufficient cross-linking between the wrapping and the central tube but merely an adhesive connection with moderate transmission of force in the longitudinal direction of pull and pressure and also the loop connection over the pins situated in the force induction element only introduces tensile forces into the wrapping.

In another known embodiment (DE-A 3 400 043), the main source of weakening in the laminate caused by the change in cross-section is not effectively compensated for by other measures.

In both embodiments, it is impossible to introduce bending moments adapted to the strength of the hollow section itself because this would cause notching or indentation in the region of the force induction elements due to the metal caps mounted on the outside and would therefore weaken the outer layers of laminate. In the prior art hollow sections, it is not possible for the user to vary the mechanical and geometrical magnitudes of the metal connecting pins, such as the damping properties or the dimensions of the connection for the pins according to his own requirements since these are laid down by the manufacturer. Accurate joining of the metal parts before and after winding and deposition of the fibres impregnated with plastic matrix, which is necessary for the production of the force induction elements, must to a large extent be carried out manually and is therefore very time consuming. When the force induction element is made in one piece with a hollow section according to DE-A-2 926 493, deposition of the reinforcing fibres can only be carried out with a roving because it is only in this way that the fibres can be correctly wound round the rings of pins on the pole caps. For exact deposition of the threads, the winding speed must be very low in this position. These conditions for manufacture in the region of the force induction element limit the possibilities of rapid production and render the process uneconomical.

The problem to be solved consists of producing a hollow section with a force induction element forming an integral part thereof, in which high bending moments and/or torsion moments can be introduced in addition to high longitudinal tensile and/or pressure forces, and of providing a simplified and more rapid process for producing the same.

This problem is solved by the fact that the jacket consists of a radial enlargement of the hollow section, which enlargement extends around the periphery of said section and tapers into a narrow section at its free end; in that the core is in the form of an expansion element which corresponds with the end of the tie rod contained therein in the form of a clamping member, and in that the expansion element in its tensioned form lies against the interior of the enlargement in a form-fitting manner over the length of the enlargement.

This advantageously provides a positive form fit for the induction of the tensile and pressure forces.

Moreover, this construction enables not only high tensile and pressure forces to be introduced but also high bending moments. The geometrical form of the force induction element should, of course, be so chosen that the flow of force is as far as possible uniform and that it passes continuously into the hollow section proper. The enlargement of the hollow section should therefore advantageously be symmetrical in the longitudinal direction as may be obtained, for example, by imparting to this enlargement a spherical form or the form of a double cone consisting of a portion progressively increasing in width in the radial direction in the form of a cone followed by a cylindrical portion which in turn progressively tapers towards the end of the hollow section. The enlargement is preferably also symmetrical in cross-section.

The enlargement of the hollow section increases the polar moment of resistance, thereby to a large extent compensating for the weakening of the laminate in the region of the force induction element which unavoidably occurs in the manufacturing process due to the displacement of the reinforcing fibres from their original orientation The fibres may be used in the form of rovings, slivers, strips or woven or knitted tubes, as in conventional structures of this kind. The fibres used are mainly glass fibres but any other known organic or inorganic reinforcing fibres, especially of the kind which have long been used in the manufacture of pipes. may be used. The reinforcing fibres are normally arranged parallel to the axis of the hollow section and/or placed helically around the hollow section but the fibre reinforcement may also be wrapped circumferentially round the section.

It goes without saying that this general reinforcement of the hollow section proper is continued into the force induction element which forms an integral part of the hollow section.

The expansion element preferably lies in a form-fitting manner against the whole length of the enlargement. It is however sufficient if it lies against the widening or narrowing areas of the enlargement to such an extent that the tensile and pressure forces to be expected in the use concerned can be reliably introduced into the hollow section. The expansion element itself advantageously consists of plastic, such as a fibre-reinforced thermoset plastic, or metal, such as for example steel or aluminium. The clamping member can consist of the same material. The expansion element and the clamping member preferably interact by means of conical surfaces. The expansion element does for example have several slots in a longitudinal direction over its periphery or consists of individual lamellas. The force is introduced into the hollow section directly by the clamping member via the expansion element by means of form-locking. No additional force-transfer properties would be obtained if the expansion element were to be connected to the inner wall of the enlargement by adhesion.

The length of the enlargement is preferably 0.5 to 1.5 times the internal diameter of the hollow section, in particular 1.0 times.

Another special embodiment is characterised by an average radial increase in the diameter of the hollow section to 1.2 to 1.6 times in the region of the enlargement, preferably 1.5 times.

Lastly, the internal diameter of the narrow section is advantageously equal to that of the hollow sectIon and Its length advantageously amounts to 0.1 to 0.5 times the diameter of the hollow section, preferably 0.25 times.

Optimum force induction may be expected if the dimensions are kept within these limits.

One particularly advantageous embodiment has an internal sleeve.

Such an internal sleeve advantageously consists of a permanently deformable material which becomes bonded to the synthetic resin matrix when the force induction element is being formed such sleeves provide protection against the connecting elements. If damaging influences are to be expected, the sleeves would be made of a material which is resistant to such influences.

In a further embodiment, an additional reinforcement is provided by an external sleeve.

This preferably also consists of long fibre reinforced plastic with circumferential windings. An external sleeve of this kind is rigid and already has the form of the force induction element to be produced. It serves to take up high radial forces of pressure such as occur in particular when moments of torsion and/or bending are introduced.

An additional fibre reinforcement is advantageously provided in the region of the force induction element.

This enables the strength to be increased in this region and/or made equal to that of the remaining hollow section. These additional reinforcements should be arranged to merge smoothly into the hollow section proper.

In a particular embodiment, the enlargement has the contour of a polygon in cross-section for the introduction of high moments of torsion. This polygon may be, for example, hexagonal.

Isolated parts of the core may be left in the hollow section. Such core elements may be made of metal or of thermosetting or thermoplastic resins, with or without fibre reinforcement.

The new process for the manufacture of a hollow section, in particular a tube, of long fibre reinforced plastic having an integrated force induction element at least at one end thereof is based on the application of reinforcements to a mould core and simultaneous or preceding impregnation with a plastic matrix and curing of the laminate.

The novelty is to be seen in the fact that in the region where the force induction element is to be formed, a moulding element is increased in width after the application of the impregnated reinforcement, and the reinforcement is pressed against the wall of a cavity which determines its form, in that after the plastic matrix has cured the core is removed and replaced by an expansion element with a corresponding clamping member and this expansion element is expanded in such a manner by means of the clamping member that it is made to lie in a form-fitting manner against the interior of the enlargement over the length of the enlargement.

This enables the force induction element to be directly formed in one piece with the hollow section or attached thereto, and the fibre reinforcement is shaped at the same time in a particularly non-damaging manner.

The pressure for deformation may be applied by hydraulic, pneumatic or mechanical means.

Additional fibre reinforcements are preferably provided in the region of the force induction element to be formed.

This measure can easily be accommodated in the production sequence. The fibres which extend in the longitudinal direction of the hollow section are preferably arranged so that they are still flush with one another when the part has been enlarged windings which extend at an average angle of from 30° to 60° to the axis of the hollow section so that the fibres extend in particular at an angle of 45° to the direction of induction of thrust are laid down at a different angle from those mentioned above in the region of the force induction element so that when the section is enlarged while the laminate is still wet, these fibres will adjust themselves to an angle of 45°. Instead of using fibre strands, a diagonally woven fibre tube may be used, which is pulled over the core. The fibre tube is preferably gathered in the region of the subsequent enlargement so that sufficient material will be available when the section is enlarged.

According to a particular method of carrying out the process, an internal sleeve which can be permanently deformed and/or a rigid external sleeve is/are provided in the region where the force induction element is to be formed, Since the internal sleeve is permanently deformable, it can easily be shaped together with the force Induction element, in the same production step.

A rigid external sleeve is pushed over the part of the section which is to form the force induction element after application of the impregnated reinforcing fibres and before the manufacturing process for forming the force induction element.

Two exemplary embodiments of the new hollow section are illustrated purely diagrammatically in the drawing, in which FIG. 1 represents a section taken on the line A-B of FIG. 2 through a force induction element of a hollow section according to a first embodiment, FIG. 2 represents a longitudinal section through this hollow section, including the part thereof which forms the force induction element, and FIG. 3 represents a longitudinal section through a hollow section with force induction element according to a second embodiment, both before the force induction element has been formed and after its formation.

In FIGS. 1 and 2, the hollow section 1 comprises the main section 1 itself and the force induction element 2 forming an integral part thereof. It is made of a polyester resin with glass fibre reinforcements embedded therein comprising a layer 15 of glass fibre rovings under 45° and a layer 16 of axially directed glass fibre rovings. Its jacket 3 consisting of the laminate and reinforced by an additional layer 17 of glass fibres under 45° its formed as a radial enlargement 4 of the hollows section 1 and tapers towards its free end 5 into a narrow section 6. The length of the radial enlargement 4 including its oblique portions 7 and 8 is approximately equal to 1.0 times the internal diameter of the hollow section 1. The radial enlargement 4 is further characterised in that the diameter of the hollow section in this part is increased on average to about 1.3 times that of the hollow section 1. The jacket 3 of the enlargement 4 is in the form of a hexagon in cross-section. It encloses an expansion element or core 9 made of aluminium which is acted upon by a clamping member 10. This clamping member 10 merges into a tie rod 11 which is anchored in a foundation (not shown). This tie rod has a screw thread 12 on which a nut 13 is mounted. When the nut 13 is tightened, the clamping member 10 pushes the expansion element 9 against clamping disc 14 so that the expansion element 9 is pushed outwards into the enlargement 3 as shown below the central axis in FIG. 2. Above the central axis, the expansion element 9 and clamping member 10 are shown in their initial state.

In FIG. 3, the hollow section 31, of which only a portion with the force induction element 32 is shown, consists of a layer 33 of glass fibre rovings impregnated with polyester resin and wound at an angle of 45° covered by a layer 34 of unidirectionally reinforced material which is also impregnated with polyester resin and is placed on the glass fibre rovings in the longitudinal direction. Element 32 is reinforced with an additional layer 52 of glass fibre wound at 45°. As regards the further construction of the hollow section 31, an internal sleeve 35 of plastically deformable material is provided in the region of the force induction element 32. A metallic flange 36 forms part of the core used for the manufacturing process and is removed after the laminate has hardened.

The hollow section 31 is produced by means of a rotatable central shaft 37 on which bearing bushes 38 are mounted (only one is shown), between which is clamped a central tube 39 (winding tube). Another bearing bush 40 is provided on the central shaft 37 in the region of the flange member 36. This bush 40 and the flange member 36 are together displaceable on the central shaft 37 by application of pressure. A moulding body or core 41 of polyurethane elastomer is situated between the bearing bushes 38 and 40. The flange member 36 has an angular groove 42 in which the edge 43 of the internal sleeve 35 engages. The second edge 44 of the internal sleeve 35 is clamped between the bearing bush 38 and the central tube 39. FIG. 3 shows the hollow section 31 before the formation of the force induction element 32 above its central axis and in Its formed state below the central axis. The moulding body 41 is changed in shape by the displacement of the bearing bush 40 and thereby shapes the force induction element 32 by pushing a jacket 45 composed of the layers 33 and 34 and the internal sleeve 35 into an appropriately shaped moulding tool 46 This jacket 45 consists of an enlargement 47 and a narrow section 49 towards the free end 48 of the force induction element 32 joined together by oblique transitional elements 50, 51 on either side of the enlargement 47.

We claim:

1. Hollow section (1, 31), in particular a tube, of long fibre (15, 33) reinforced plastic, having an integrated force induction element (2,32) at least at one end thereof, the element having a jacket (3, 45) consisting of a portion of the hollow section (1,31), the jacket (3, 45) surrounding a core (9) having a tie rod (11) extending therethrough, the improvement wherein the jacket (3, 45) consists of a radial enlargement (4, 47) of the hollow section 61, 31), the enlargement extending around the periphery of the hollow section and tapering into a narrow section (6, 49) at an end (5, 48) of the hollow section (1, 31), the core (9) being in the form of an expansion element which coacts with a clamping member (10) connected to the tie rod (11), and wherein the expansion element lies in a form-fitting manner against the interior of the enlargement (4,47) over the length of said enlargement.

2. Hollow section according to claim 1, characterised in that the length of the enlargement (4, 47) amounts to 0.5 to 1.5 times the internal diameter of the hollow section (1, 31).

3. Hollow section according to claim 1, characterised by an average radial increase in the internal diameter of the hollow section to 1.2 to 1.6 times in the region of the enlargement (4, 47).

4. Hollow section according to claim 1, characterised in that the internal diameter of the narrow section (6, 49) is equal to that of the hollow section (1, 31) and in that the length of the narrow section (6, 49) amounts to 0.1 to 0.5 times the internal diameter of the hollow section.

5. Hollow section according to claim 1, including an internal sleeve (35) and/or an external sleeve at the enlargement (47).

6. Hollow section according to claim 1, characterised by additional fibre reinforcement (12, 52) at the force induction element (2, 32).

7. Hollow section according to claim 1, characterised in that the enlargement (4) has a polygonal cross-section.

* * * * *